UNITED STATES PATENT OFFICE.

GEORGE P. LUCKEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SOLDERING-FLUX.

1,293,823.   Specification of Letters Patent.   Patented Feb. 11, 1919.

No Drawing.   Application filed March 13, 1918.   Serial No. 222,107.

*To all whom it may concern:*

Be it known that I, GEORGE P. LUCKEY, a citizen of the United States, and a resident of Wilkinsburg, in the county of Allegheny and State of Pennsylvania, have invented a new and useful Improvement in Soldering-Fluxes, of which the following is a specification.

My invention relates to soldering fluxes, and it has for its primary object the provision of a soldering flux for use at relatively high temperatures.

Previous to this, to the best of my knowledge, there were no soldering fluxes which could be satisfactorily employed at temperatures between 300° C. and 400° C., and, as a result, it has been impossible to use solders of high melting points, although, in many instances, the use of such solders is highly desirable. This is due to the fact that the ordinary rosin, rosin-zinc chlorid and organic-material fluxes cannot be used because the organic material chars at temperatures between 300 and 400° C., while the boric-acid fluxes used with brazes melt only at temperatures that are too high for use with a solder melting at a temperature under 400° C.

I have developed a soldering flux which cleans better than the present fluxes, at ordinary temperatures, and which may be used not only with solders of relatively low melting point but also with solders melting at higher temperatures, up to approximately 400° C.

Many of the metallic chlorids have a cleaning or fluxing action but their melting points are so high that the solder is oxidized before the flux melts. I have found, however, that, by making a mixture of sodium and potassium chlorids in certain proportion, to give a melting point about that desired, and fusing the mixture together, I obtain a mixture to which may be added various metallic chlorids to produce a good high-temperature flux of the character desired. A fused mixture of potassium and sodium chlorids, in the proportions which will give the mixture its lowest melting point, that is in the proportions of substantially 56% potassium chlorid and 44% sodium chlorid, will have a melting point suitable for soldering temperatures up to 400° C.

Among the metallic chlorids which may be combined, either singly or severally, with this fused mixture of sodium and potassium chlorids, are the chlorids of lithium, cadmium, copper, calcium, zinc, lead and ammonium, ammonium being considered as a metal because of its close analogy to metals, particularly potassium, in its reactions.

I have found that a superior soldering flux is formed by combining 65% of zinc chlorid and 10% of ammonium chlorid with 25% of the fused mixture of potassium and sodium chlorids, this latter fused mixture being in the proportions of 56% potassium chlorid and 44% sodium chlorid.

One method which may be followed in making my improved flux consists in fusing a mixture of the proper relative quantities of sodium and potassium chlorids and then adding to the mixture, while melted, the other ingredients desired, such as the zinc and ammonium chlorids, keeping the mixture in a fused state until all of the ingredients have been added and thoroughly intermingled by stirring during the addition of the various materials. When this complete fusing and mixing has been accomplished, the flux may be poured out and cooled.

This fusing of the flux is an important feature, as the mere mixing together of the several ingredients will not produce a flux which will fuse at the desired temperature.

It is possible, however, that an extremely intimate mixture of the ingredients, such as would be formed by making an aqueous solution of the various chlorids employed and then evaporating and calcining the residue, would fuse at such temperatures as would render it valuable as a soldering flux.

Obviously, my improved soldering flux may be employed in solid form or may be dissolved in water and used as a liquid flux. Furthermore, the temperature at which it will melt and run may be regulated by varying the proportions of the sodium and potassium chlorids employed in its composition.

While the specific proportions and ingredients set forth produce a very satisfactory high-temperature soldering flux, it is to be understood that I do not impose any limitations upon the manner of forming the flux or the ingredients or proportions of ingredients employed other than those set forth in the claims.

I claim as my invention:

1. A soldering flux comprising a mixture of substantially 65% of zinc chlorid and 10% ammonium chlorid with 25% of a fused mixture of potassium chlorid and sodium chlorid.

2. A soldering flux comprising a mixture of substantially 65% zinc chlorid and 10% ammonium chlorid, with 25% of a fused mixture of potassium chlorid and sodium chlorid in the proportion of 56% potassium chlorid and 44% sodium chlorid.

3. A soldering flux including a fused mixture of sodium and potassium chlorids and additional metallic chlorids.

4. A soldering flux including a fused mixture of sodium and potassium chlorids into which are fused zinc and ammonium chlorids.

5. A method of forming a soldering flux that comprises fusing a mixture of sodium and potassium chlorids together and adding metallic chlorids while the mass is maintained in a fused condition.

In testimony whereof, I have hereunto subscribed my name this 19th day of Feb. 1918.

GEORGE P. LUCKEY.